US010409487B2

(12) United States Patent
Won

(10) Patent No.: US 10,409,487 B2
(45) Date of Patent: Sep. 10, 2019

(54) APPLICATION PROCESSING BASED ON GESTURE INPUT

(71) Applicant: Microsoft Technology Licensing, LLC, Redmond, WA (US)

(72) Inventor: Sung Joon Won, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 230 days.

(21) Appl. No.: 15/244,383

(22) Filed: Aug. 23, 2016

(65) Prior Publication Data

US 2018/0059930 A1 Mar. 1, 2018

(51) Int. Cl.
*G06F 3/0488* (2013.01)
*G06F 3/0481* (2013.01)
*G06F 3/0482* (2013.01)
*G06F 9/451* (2018.01)
*G06F 3/023* (2006.01)

(52) U.S. Cl.
CPC ........ *G06F 3/04886* (2013.01); *G06F 3/0236* (2013.01); *G06F 3/0482* (2013.01); *G06F 3/04817* (2013.01); *G06F 3/04883* (2013.01); *G06F 9/451* (2018.02)

(58) Field of Classification Search
CPC ............. G06F 3/04886; G06F 3/04817; G06F 3/04883; G06F 3/0482; G06F 9/4443
See application file for complete search history.

(56) References Cited

U.S. PATENT DOCUMENTS

| 9,086,794 | B2 | 7/2015 | Gil et al. |
| 9,329,692 | B2 | 5/2016 | Bai et al. |
| 9,996,258 | B2* | 6/2018 | Bi ........................ G06F 3/04886 |
| 2010/0238125 | A1 | 9/2010 | Ronkainen |
| 2010/0315266 | A1 | 12/2010 | Gunawardana et al. |
| 2011/0122081 | A1 | 5/2011 | Kushler |
| 2011/0167340 | A1* | 7/2011 | Moore .................. G06F 3/0233 715/257 |
| 2011/0210850 | A1 | 9/2011 | Tran |
| 2012/0127080 | A1 | 5/2012 | Kushler et al. |
| 2013/0067382 | A1 | 3/2013 | Townsend et al. |
| 2014/0098036 | A1 | 4/2014 | Paek et al. |

(Continued)

OTHER PUBLICATIONS

Dan Seifert, "Google Releases Keyboard for the iPhone With Built-In Search Features", published on May 12, 2916 to https://www.theverge.com/2016/5/12/11662616/google-gboard-keyboard-iphone-ios, retrieved Jun. 21, 2018.*

(Continued)

*Primary Examiner* — Shourjo Dasgupta
(74) *Attorney, Agent, or Firm* — Merchant & Gould

(57) ABSTRACT

Non-limiting examples of the present disclosure describe gesture input processing. As an example, a gesture input may be a continuous gesture input that is received through a soft keyboard application. The continuous gesture input may comprise query input and a selection of an application extension displayed within the soft keyboard application. The query input may be processed using a component associated with the application extension. A result for the query input may be provided. As an example, the result may be provided by the component associated with the application extension. Other examples are also described.

20 Claims, 8 Drawing Sheets

Example: Type First, Then Swipe to Application Extension

(56) References Cited

U.S. PATENT DOCUMENTS

| | | | |
|---|---|---|---|
| 2014/0244243 A1* | 8/2014 | Kim | G06F 17/276 704/9 |
| 2016/0132195 A1 | 5/2016 | Seto et al. | |
| 2017/0102870 A1 | 4/2017 | Won | |
| 2017/0255278 A1* | 9/2017 | Aley | G06F 17/276 |

OTHER PUBLICATIONS

Atharva Unde, "New Google Keyboard Updated With Gesture Typing One Hand Mode and New Emoji", published on May 3, 2016 to https://www.youtube.com/watch?v=uM7wTvBI0-Q, retrieved Jun. 21, 2018.*

Alex Heath, "Giphy Built the World's Best GIF Keyboard for the iPhone", published on May 3, 2016 to http://www.businessinsider.com/gif-iphone-keyboard-from-giphy-review-2016-5, retrieved Jun. 21, 2018.*

Madeline Buxton, "Google Just Seriously Changed Texting", published on May 12, 2016 to https://www.refinery29.com/2016/05/110661/google-keyboard-app-texting, retrieved Jun. 21, 2018.*

"International Search Report and Written Opinion Issued in PCT Application No. PCT/US2017/047239", dated Nov. 21, 2017, 11 Pages.

"Ai.Type Keyboard Plus + Emoji", Retrieved on: Jun. 20, 2016, 4 pages. Available at: https://play.google.com/store/apps/details?id=com.aitype.android.p&hl=en.

Chokkattu, Julian, "Google's new iOS Keyboard is the only one you'll ever need to download", Published on: May 12, 2016, 5 pages. Available at: http://www.digitaltrends.com/mobile/google-gboard-ios/.

"Using Swype", Published on: Sep. 24, 2015, 2 pages. Available at: http://www.htc.com/us/support/t-mobile-mytouch-4g-slide-t-mobile/howto/315082.html.

"Fleksy + GIF Keyboard", Published on: Dec. 20, 2015, 4 pages. Available at: https://play.google.com/store/apps/details?id=com.syntellia.fleksy.keyboard.

Stegner, Ben, "iOS 8 Lets You Replace Your iPhone or iPad's Keyboard—Here's How", Published on: Sep. 23, 2014, 10 pages. Available at: http://www.makeuseof.com/tag/ios-8-lets-replace-iphone-ipads-keyboard-heres/.

"Method for Having a Barcode Scanner as a Keyboard in iOS?", Published on: Aug. 31, 2015, 2 pages. Available at: http://stackoverflow.com/questions/19968653/method-for-having-a-barcode-scanner-as-a-keyboard-in-ios.

"On Screen Keyboard User Interface", Retrieved on: Jun. 20, 2016, 2 pages. Available at: http://www.my-t-soft.com/mytsoft/mytsoft.htm.

* cited by examiner

Example: Type First, Then Swipe to Application Extension

Example: Start From Application Extension, Then Continue Swipe To Query Input

600

APPLICATION PROCESSING BASED ON GESTURE INPUT

BACKGROUND

Query processing continues to develop where an aim of query processing is to efficiently provide relevant results for a query. In cases where a user wants to utilize a particular application to process a query, a user is required to take multiple steps to initiate query processing. For example, a user has to launch a particular application and then enter a query within the launched application, among other steps. Gesture typing provides a user with a method for faster entry of words/phrases/sentences, etc. However, gesture typing functionality does not extend to entering query input and concurrently enabling selection of applications/services using the same gesture input. As such, examples of the present application are directed to the general technical environment related to improving query processing and efficiency of devices, for example, when processing gesture input.

SUMMARY

Non-limiting examples of the present disclosure describe gesture input processing. As an example, a gesture input may be a continuous gesture input that is received through a soft keyboard application. The continuous gesture input may comprise query input and a selection of an application extension displayed within the soft keyboard application. The query input may be processed using a component associated with the application extension. A result for the query input may be provided. As an example, the result may be provided by the component associated with the application extension.

In other non-limiting examples, a soft keyboard application is accessed on a computing device. A continuous gesture input may be provided through the soft keyboard application. The continuous gesture input may comprise: a query input, a pause at an application extension displayed through the soft keyboard application, and a selection of a user interface feature of the application extension that is displayed in response to the pause. One or more results for the query input may be received. In one example, the one or more results are provided by a component associated with the application extension based on the continuous gesture input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
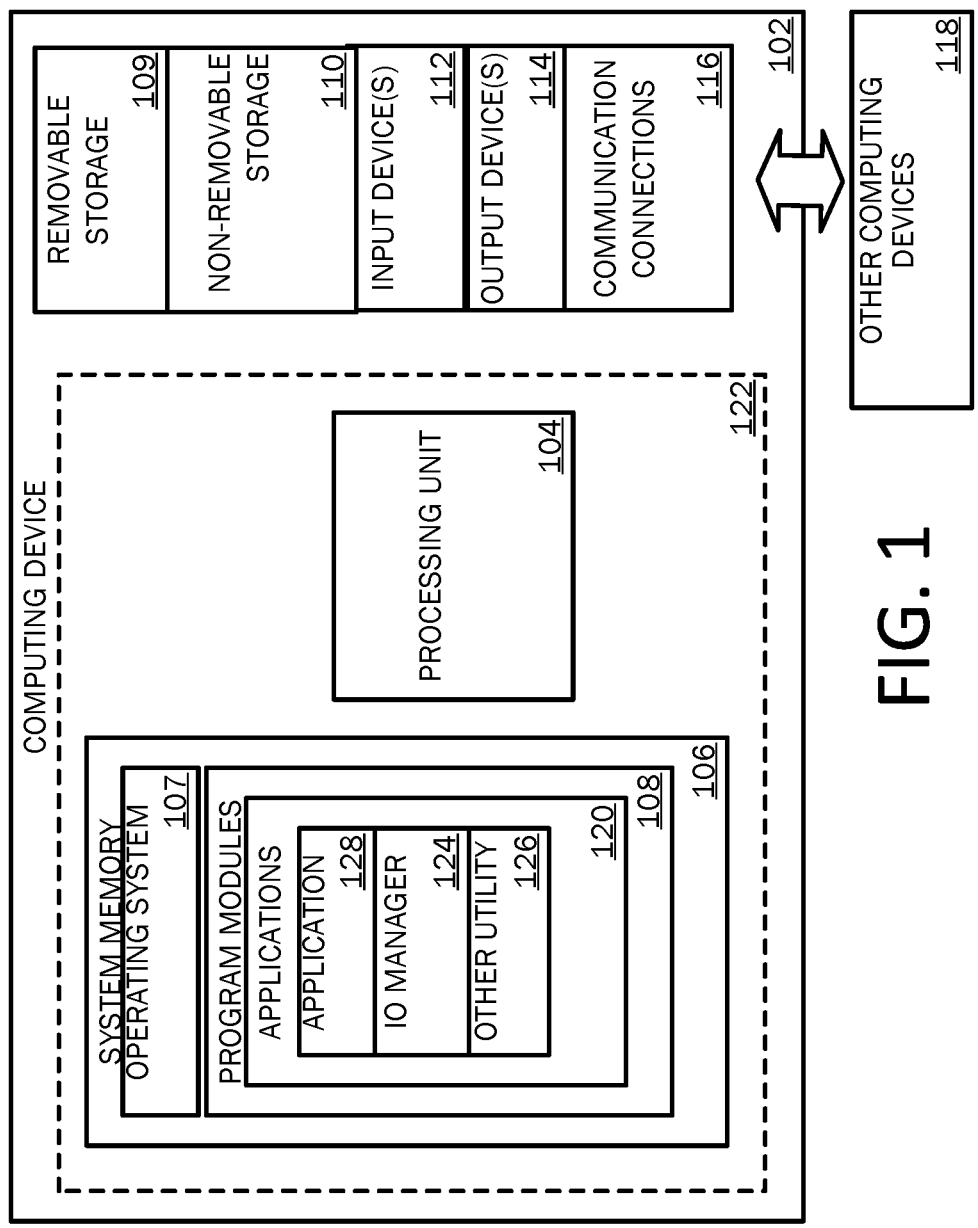
FIG. 1 is a block diagram illustrating an example of a computing device with which aspects of the present disclosure may be practiced.

Non-limiting examples of the present disclosure describe gesture input processing. A gesture input is an act or instance of entering an input by moving an object or digit (e.g. finger) across a screen (e.g. touchscreen) to activate a function. An example of a gesture input may be a continuous gesture input that is received through a soft keyboard application. A continuous gesture input may comprise query input and selection of an extension of at least one/application service that may be utilized to process the query input. An extension of an application/service is a user interface element (e.g. within a soft keyboard application) that provides direct access to an application/service. An application (e.g. first-party application, second-party application, third-party application) may be integrated with the soft keyboard application. Examples of application extensions may be found in co-pending U.S. patent application Ser. No. 14/880,395 filed on Oct. 12, 2015, which is hereby incorporated by reference.

As an example, a user may enter a swipe action that provides query input of a user name such as "Jessica" and continue the swipe action to an application extension within a soft keyboard application that provides access to a contact list/address book of a user. A user contact list can be searched and results may be provided, for example, directly in the soft keyboard application (or an application interfacing with the soft keyboard application). The results may be provided based on processing of the continuous gesture input without requiring multiple input steps. Thus, a query can be more efficiently processed when gesture inputs are utilized to enter the query.

Functionality for receiving and processing a continuous gesture input can be programmed into a soft keyboard application. An exemplary soft keyboard application may be a software component that provides application control for any applications/services executing on a computing device. An exemplary soft keyboard application may enables users to enter any type of input including but not limited to: alphanumeric characters, symbols, images, icons, punctuation marks, gesture input, voice input, and handwritten input, among other examples. Soft keyboard applications may be programmed to process input in any language and may be further configured to switch between different languages. Among other examples, the soft keyboard application may be used to: find answers, locate files, translate data, use features from other applications, receive suggestions/recommendations, improve selection of content with application extensibility, evaluate context of threads within executing applications and provide auto-completion/auto-insertion of content into applications, and transfer data between applications, among other examples. One skilled in the art should recognize that exemplary soft keyboard applications are not limited to the above described actions/features. Additional examples related to soft keyboard applications may be found in co-pending U.S. patent application Ser. No. 14/880,395 filed on Oct. 12, 2015, which is hereby incorporated by reference. As an example, the soft keyboard application may facilitate integration of services (e.g. first-party services, second-party services, third-party services) to retrieve content, accomplish tasks, etc., that a single application may not be able to complete.

Accordingly, the present disclosure provides a plurality of technical advantages including but not limited to: an improved soft keyboard application, improved functionality for gesture inputs, improved query processing including more efficient operation of processing devices (e.g., saving computing cycles/computing resources) during processing of gesture input, extensibility to integrate processing operations described herein within different applications/services, and improved user interaction, among other examples.

Figure 2A:
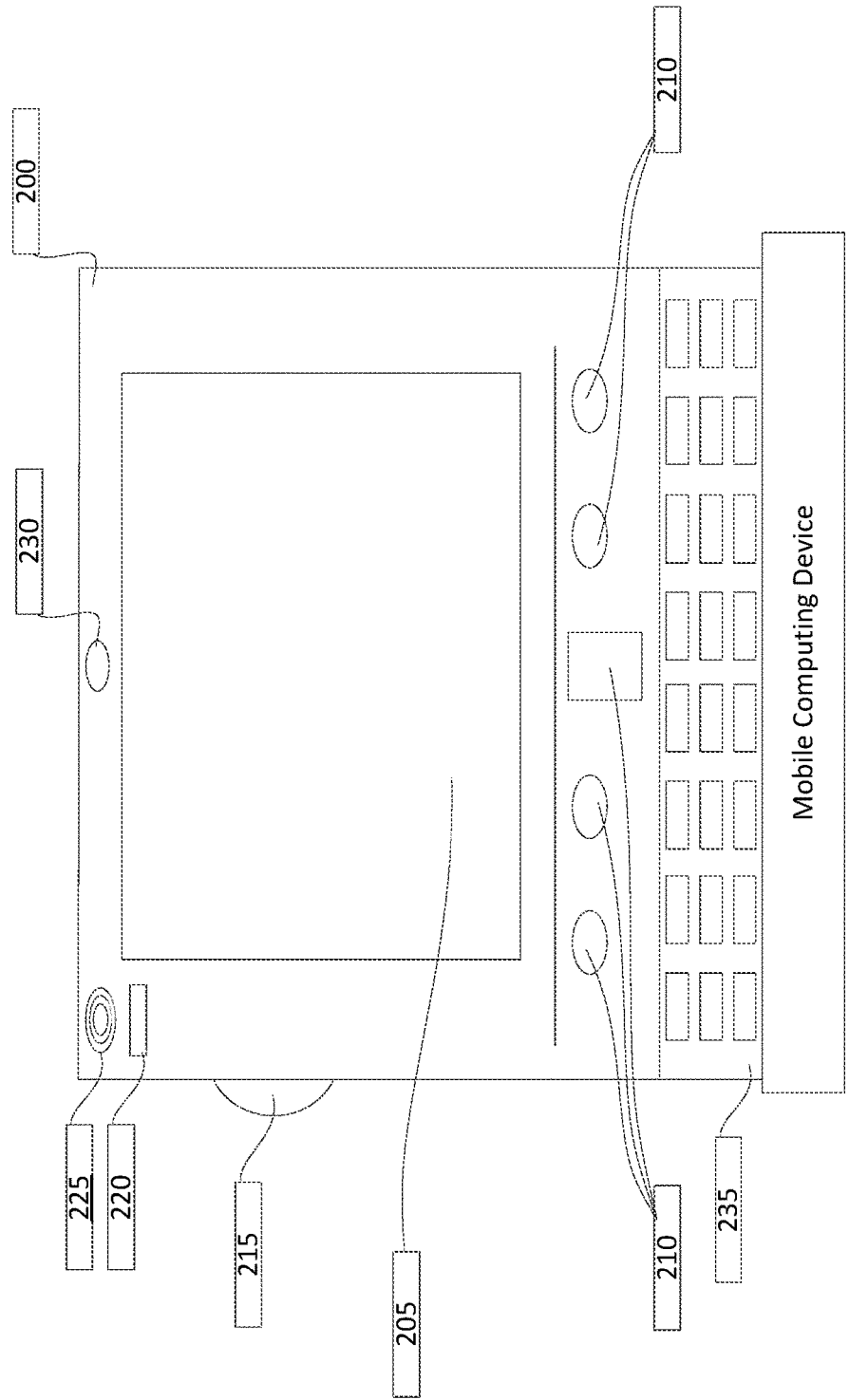
FIGS. 2A and 2B are simplified block diagrams of a mobile computing device with which aspects of the present disclosure may be practiced.
Figure 2B:
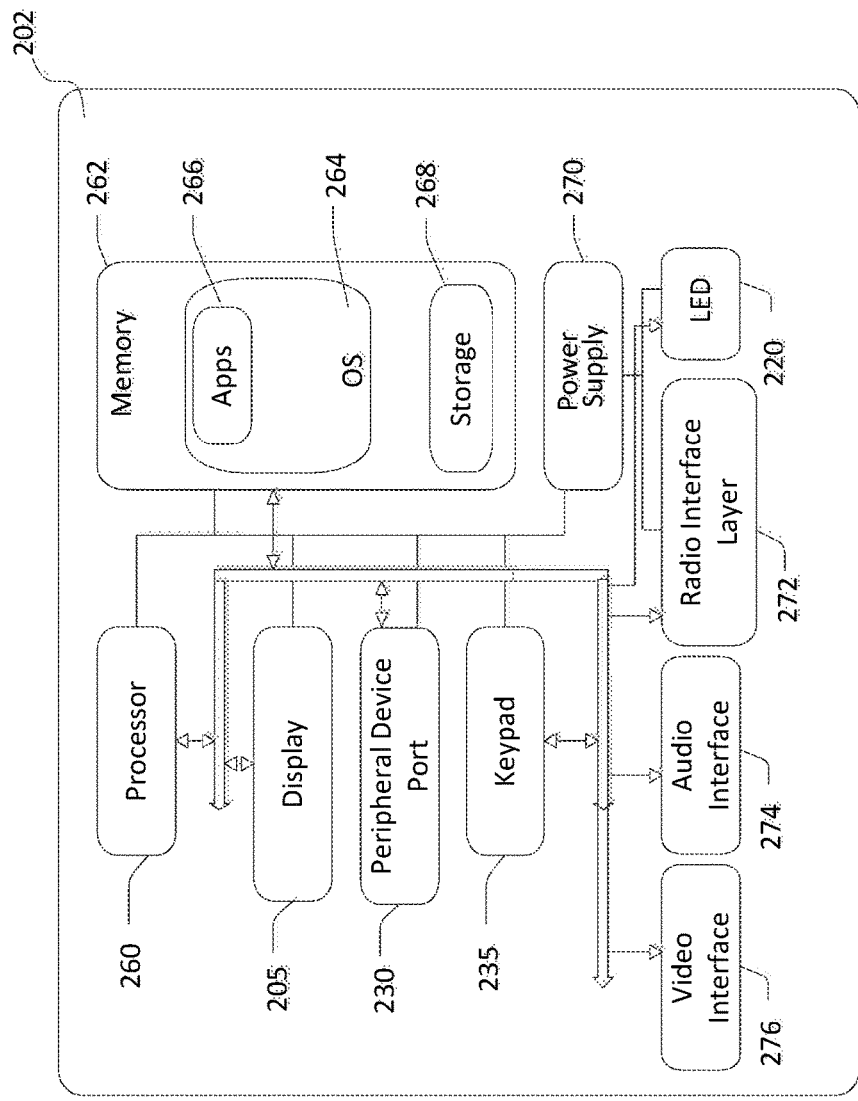
Figure 3:
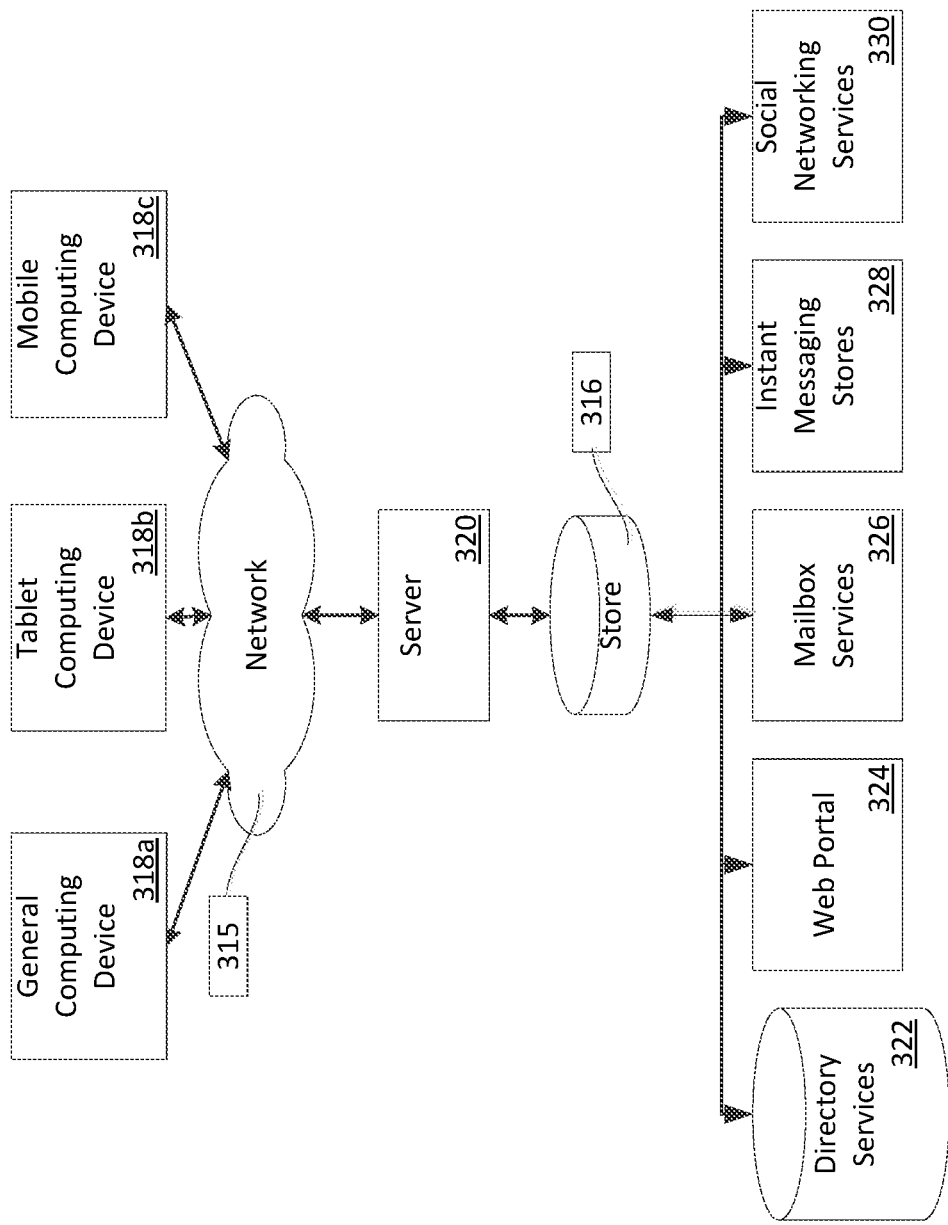
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device configured for execution of an exemplary soft keyboard application that implements gesture input as described in examples herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 102 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for an exemplary soft keyboard application that implements gesture input as described in examples herein. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (e.g. identified in FIG. 2A). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for provisioning an application that reliably accesses target data on a storage system and handles communication failures to one or more client devices, as described above. The system of FIG. 3 may be an exemplary system configured for an exemplary soft keyboard application that implements gesture input as described in examples herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
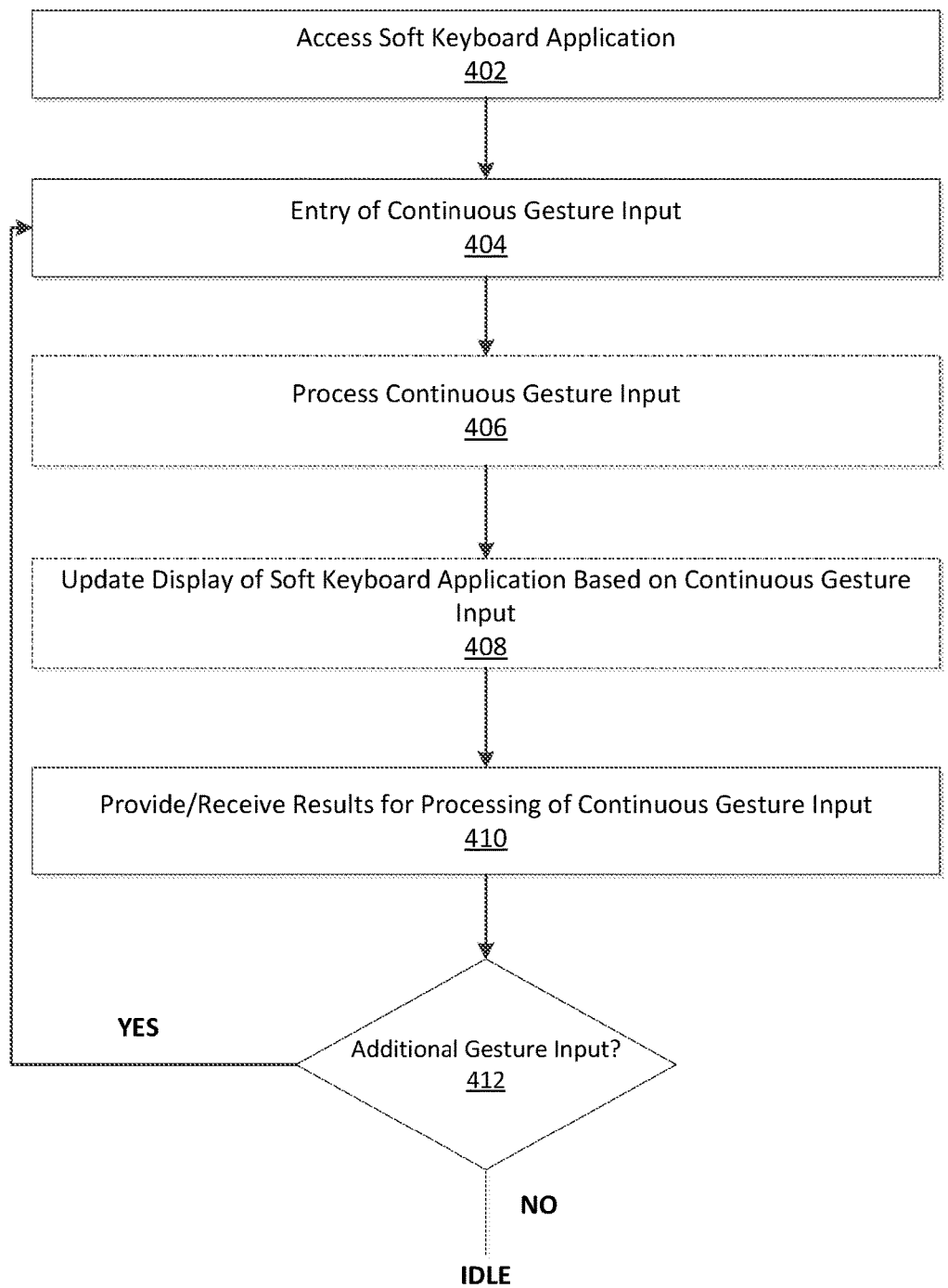
FIG. 4 is an exemplary method related to processing of an exemplary continuous gesture input with which aspects of the present disclosure may be practiced.

FIG. 4 is an exemplary method 400 related to processing of an exemplary continuous gesture input with which aspects of the present disclosure may be practiced. As an example, method 400 may be executed by an exemplary processing device and/or system such as those shown in FIGS. 1-3 and 6. In examples, method 400 may execute on a device comprising at least one processor configured to store and execute operations, programs or instructions. Operations performed in method 400 may correspond to operations executed by a system and/or service that execute computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc. In other examples, method 400 may be executed by one or more computing devices. For instance, a client device may be executing a soft keyboard application where operations described in at least method 400 may be executed in association with the client device.

Method 400 begins at operation 402, where an exemplary soft keyboard application is accessed. As described above, an exemplary soft keyboard application may be a software component that provides application control for any applications/services executing on a computing device. A soft keyboard application may enables users to enter any type of input including but not limited to: alphanumeric characters, symbols, images, icons, punctuation marks, gesture input, voice input, and handwritten input, among other examples. Soft keyboard applications may be programmed to process input in any language and may be further configured to switch between different languages. Among other examples, the soft keyboard application may be used to: find answers, locate files, translate data, use features from other applications, receive suggestions/recommendations, improve selection of content with application extensibility, evaluate context of threads within executing applications and provide auto-completion/auto-insertion of content into applications, and transfer data between applications, among other examples. One skilled in the art should recognize that exemplary soft keyboard applications are not limited to the above described actions/features. Additional examples related to soft keyboard applications may be found in co-pending U.S. patent application Ser. No. 14/880,395 filed on Oct. 12, 2015, which is hereby incorporated by reference. As an example, the soft keyboard application may facilitate integration of services (e.g. first-party services, second-party services, third-party services) to retrieve content, accomplish tasks, etc., that a single application may not be able to complete.

A soft keyboard application may be executing on a computing device, for example a client device such as a mobile phone, tablet, laptop, personal computer, navigation system, or any other device with touchscreen capabilities. In examples, the soft keyboard application may be a software component within an application/service that is executing on a client device. Accessing (operation 402) of the soft keyboard application may comprise displaying the soft keyboard application on a display associated with (or included within) a computing device. In one example, a soft keyboard application may be automatically accessed (operation 402) when a user interface element for input is selected within an application/service.

Flow may proceed to operation 404, where a continuous gesture input may be entered. A continuous gesture input may comprise query input and selection of an extension of at least one/application service that may be utilized to process the query input. In further examples, the continuous gesture input may comprise additional actions comprising but not limited to: pauses, selection of user interface elements within a soft keyboard application, and touch-based indications (e.g. pressure sensitivity that can be used to specify user intention). An extension of an application/service is a user interface element (e.g. within a soft keyboard application) that provides direct access to an application/service. Examples of application extensions may be found in co-pending U.S. patent application Ser. No. 14/880,395 filed on Oct. 12, 2015, which is hereby incorporated by reference.

An exemplary continuous gesture input may be received through a soft keyboard application executing on a computing device. Examples of a continuous gesture input are illustrated in processing device views shown in FIGS. 5A and 5B, which are further described below. As an example, query input is any data that is usable as a cue for providing results from an application/service that is associated with a selected extension of an application/service. The query input may comprise one or more of: alphanumeric characters, symbols, images, icons, punctuation marks, etc. The continuous gesture input may be a swipe action, where an object or digit may be utilized to provide the continuous gesture input. Examples of objects/digits that may be used for entering continuous gesture input comprise but are not limited to: one or more fingers, a stylus, and a mouse, among other examples. One skilled in the art that understands the present disclosure should recognize that other objects and/or digits can also be used to enter the continuous gesture input.

As an example, a user may enter a swipe action that provides query input of a user name such as "Jessica" and continue the swipe action to an application extension within a soft keyboard application that provides access to a contact list/address book of a user. A user contact list can be searched and results may be provided directly in the soft keyboard application based on processing of the continuous gesture input without requiring multiple input steps. Thus, a query can be more efficiently processed when gesture inputs are utilized to enter the query.

In at least one example, input from an exemplary continuous gesture input may be transmitted to one or more computing devices that may be connected with a client device over a distributed network. In examples where an exemplary continuous gesture input is entered on a client device, the continuous gesture input may be transmitted to and received at another computing device, which may be utilized to process the continuous gesture input. In alternative examples, the continuous gesture input may be processed directly using an application/service that is executed on a client computing device. In such examples, the application/service executing on the client computing device is configurable to access applications/services that may be integrated with an exemplary soft keyboard application. For instance, the soft keyboard application may provide extensions for application/services that can be accessed over a network connection (e.g. the Internet, cellular service).

At operation 406, the continuous gesture input may be processed. As described above, processing of a continuous gesture input may occur at a client computing device or by one or more other devices connected with the client computing device over a distributed network. In examples, where processing of the continuous gesture input occurs over a distributed network, flow of method 400 may proceed to operation 410, where results for the continuous gesture input may be provided to a computing device (e.g. client computing device).

In examples where processing (operation 406) of the continuous gesture input occurs, the query input may be processed using a component associated with a selected application extension. As described above, a continuous gesture input may comprise input and a selection of at least one application extension for an application/service associated with the soft keyboard application. In some examples, multiple application extensions may be selected. For example, an input may be entered and a swipe action may successively swipe multiple application extensions within the soft keyboard application. In such a case, the query input may be processed and results provided from multiple application extensions. For instance, a query of "my house" may be entered into a soft input keyboard, where a swipe action may continue to select an application extension for a location service and an application extension for a translation service, for example, to translate the query from a first language (e.g. English) to a second language (e.g. Spanish). In such a case, a result from the location service may be provided which provides location details for a user's home and another result may be provided that shows that "my house" translates to "mi casa" in Spanish. In some examples, a user may extend the continuous gesture input to select more than one application extension.

As referenced above, the continuous gesture input may comprise additional actions such as a pause action. For instance, a user may be swiping alphanumeric characters and continue movement of the input to an application extension. The user may pause (e.g. while keeping a finger pressed down on a touchscreen) at an application extension. In processing such a continuous gesture input, an exemplary soft keyboard application may be configured to trigger display of additional user interface features related to the application/service that is associated with the application extension. As an example, a user may pause at an application extension for a translation service, where a user may pause/hover over the application extension for the translation service resulting in display of options for translating the query input into another language. For instance, a user interface element may be displayed that provides quick selection options for translating a query input into one or more different languages.

In another example, a user may be entering a query input and proceed to pause at a user interface element of the soft keyboard application (that is not an application extension). For instance, a user may not see display of an application extension for a desired application/service. As there is typically a fixed amount of display space (especially on mobile devices), a pause action within the continuous gesture input may be used to trigger display of additional application extensions.

In alternative examples, user interface elements for navigating the soft keyboard application may also be selectable within the continuous gesture input. For instance, an ellipsis icon may be displayed in a listing of application extensions, where selection of the ellipsis icon may trigger display of additional application extension. However, one skilled in the art that understands the present disclosure should recognize that any type of user interface element can be created and configured for navigation of the soft keyboard application.

Furthermore, touch-based indications may be utilized to navigate functionality provided by an exemplary soft keyboard application. For instance, a user may press harder (or softer) on a user interface element, which may be used to signal an intent of the user. As an example, a user may pause on an application extension and use touch indications to select options for processing using an application extension.

In examples where a continuous gesture input comprises an action such as a pause, flow may proceed to update (operation 408) display of the soft keyboard application based on processing of the continuous gesture input. In one example, a user may pause a continuous gesture input at an application extension while maintaining contact with a touchscreen. In such an example, processing occurs that updates the soft keyboard application to display one or more user interface features associated with the application extension. Once the user interface features of the application extension are displayed, the user may continue the continuous gesture input to select a feature associated with the application extension. In another example, a user may pause the continuous gesture input at a first application extension and then resume movement of the continuous gesture application to a second application extension. In such an example, the query input associated with the continuous gesture input may be processed by a component of the first application extension and also a component of the second application extension.

Flow may proceed to operation 410, where results may be provided and/or received based on processing of the continuous gesture input. In an example where the continuous gesture input is entered through a client computing device that connects with other devices (which process the continuous gesture input) over a distributed network, a result for the continuous gesture input may be provided to and received at the client computing device.

In some examples, results for the query input may be provided within the soft keyboard application from each application extension. For instance, a portion of the soft input keyboard may be allocated to providing results data. In one example, results data may be returned within a portion of the soft keyboard application that the query input was entered. In alternative examples, results may also be provided outside of the soft keyboard application. For instance, a result for a query input may be provided in one or more of: an application/service (e.g. within a messaging thread of an application), a home-screen of a device, a message, and an email, among other examples. That is, an exemplary soft keyboard application may interface with other applications/services to provide a result from processing by the soft keyboard application.

At decision operation 412, it is determined whether additional gesture input is received. If so, flow branches YES and returns back to operation 404, where a continuous gesture input is entered. If no additional gesture input is received, flow branches NO and processing of method 400 remains idle until further gesture input is received.

Figure 5A:
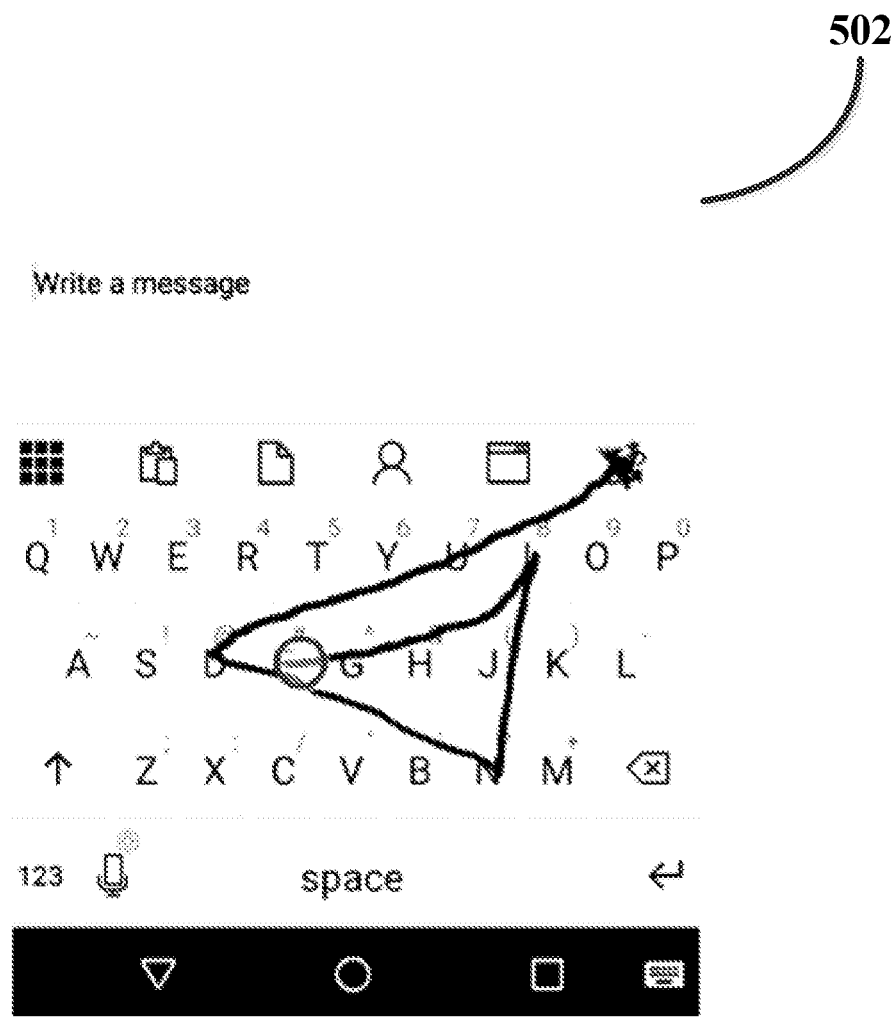
FIGS. 5A and 5B are exemplary processing device views illustrating examples of continuous gesture input with which aspects of the present disclosure may be practiced.
Figure 5B:
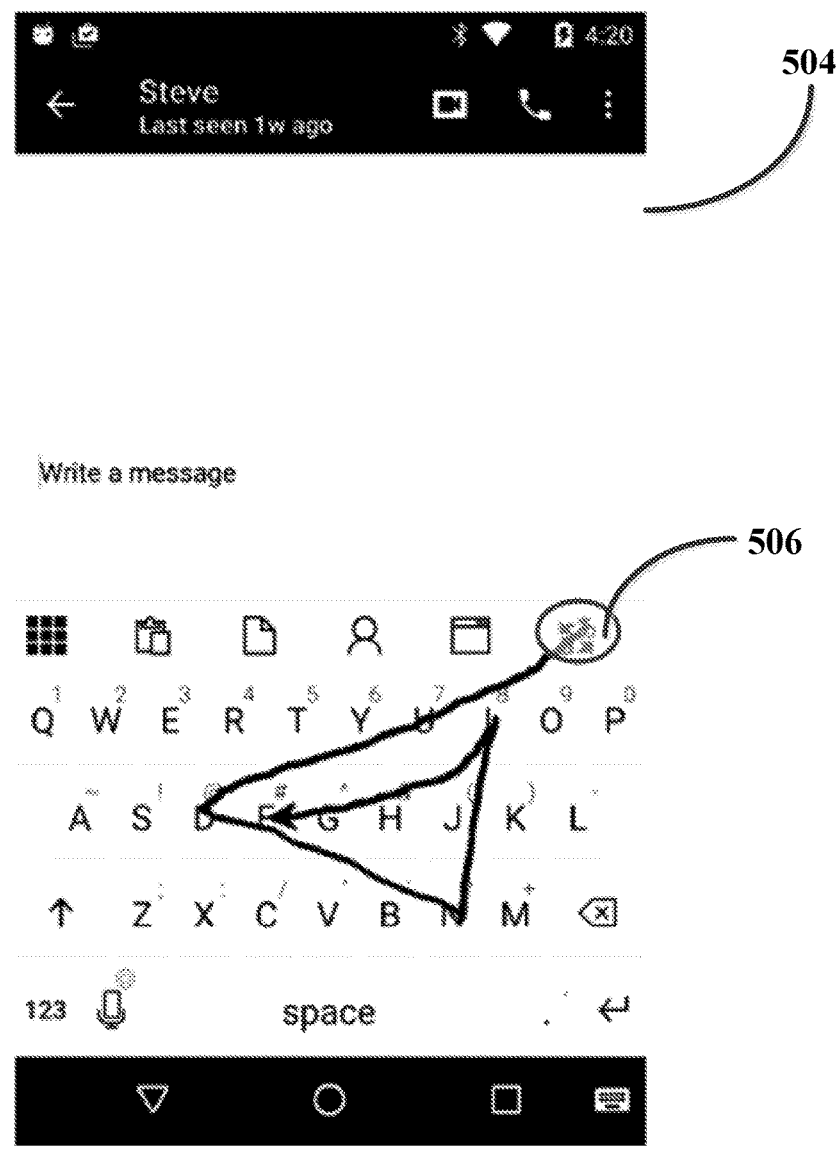

FIGS. 5A and 5B are exemplary processing device views illustrating examples of continuous gesture input with which aspects of the present disclosure may be practiced. Processing operations related to the display shown in FIGS. 5A and 5B are described in at least the description of method 400 (of FIG. 4).

FIG. 5A illustrates processing device view 502. Processing device view 502 highlights an exemplary continuous gesture input being entered within a soft keyboard application. An exemplary query input is first entered and a swipe action continuous to an exemplary application extension. As shown in processing device view 502, a query input starts on the alphabetic character "F" and continuously enters a swipe input of "find" and then continues to select an exemplary application extension. Processing of that continuous gesture input may be a result for the query input "find" by an application/service associated with the selected application extension.

FIG. 5B illustrates processing device view 504. Processing device view 504 highlights an exemplary continuous gesture input being entered within a soft keyboard application. In processing device view 504, a swipe action starts from an exemplary application extension 506 and then continues to enter a query input. As shown in processing device view 504, an application extension 506 is selected and a query input of "find" is entered. Processing of that continuous gesture input may be a result for the query input "find" by an application/service associated with the selected application extension.

Processing device views 502 and 504 highlight flexibility in selection of an exemplary application extension before or after a query input. In alternative examples, a first application extension may be selected, a query input may follow, a second application extension may then be selected and a second query input may follow. In such an example, a user may be able to enter multiple query inputs (to be processed by different application extensions) within a single continuous gesture.

Figure 6:
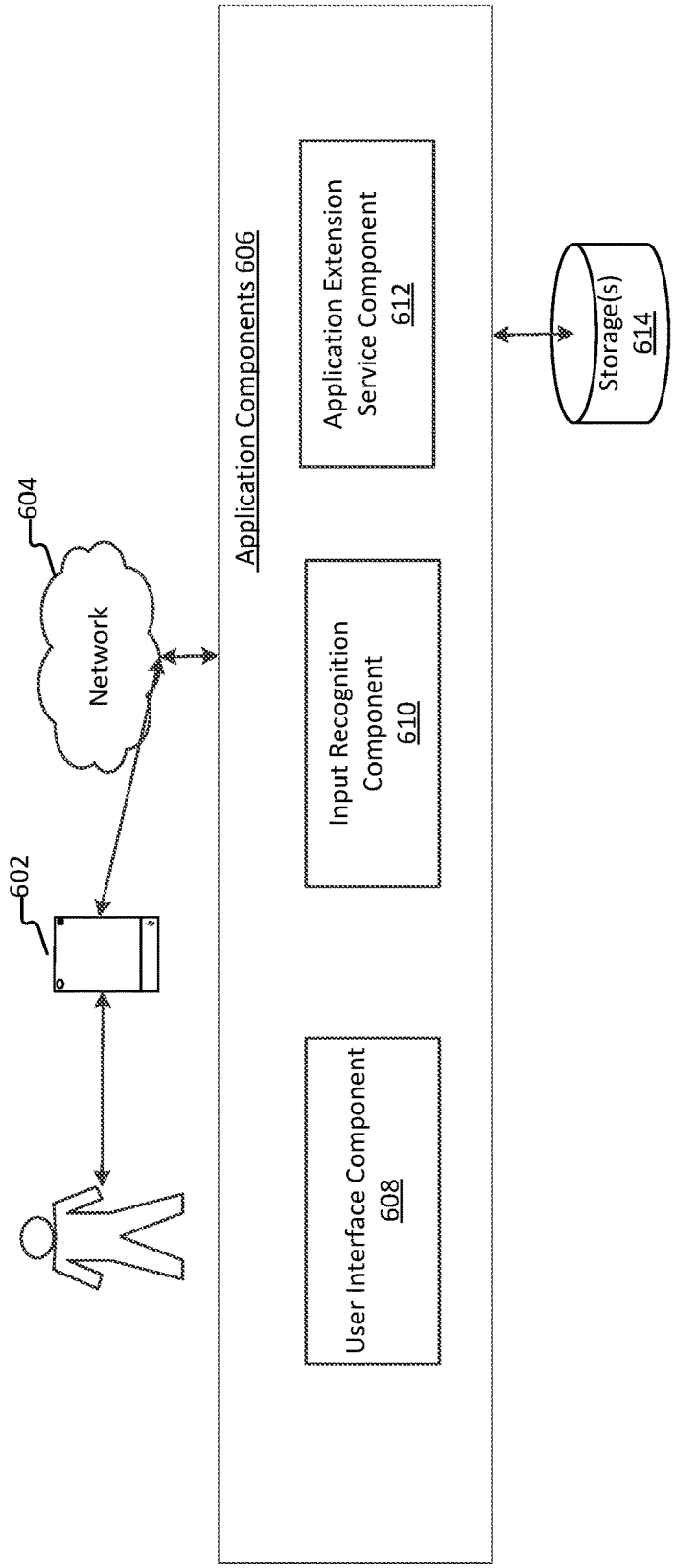
FIG. 6 illustrates an exemplary system implementable on one or more computing devices on which aspects of the present disclosure may be practiced.

FIG. 6 illustrates an exemplary system 600 implementable on one or more computing devices on which aspects of the present disclosure may be practiced. System 600 may be an exemplary system for processing related to management and use of task definitions for task state tracking as described herein. Exemplary system 600 presented is a combination of interdependent components that interact to form an integrated whole for implementing operations for compliance scanning as described in examples herein. Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. In other examples, the components of systems disclosed herein may be spread across multiple devices. For instance, input may be scanned on a client computing device where processing operations may occur through one or more devices in a distributed network such as one or more server devices.

In examples, one or more data stores/storages or other memory are associated with system 600. For example, a component of system 600 may have one or more data storage(s) 614 (described below) associated therewith. Data associated with a component of system 600 may be stored thereon as well as processing operations/instructions executed by a component of system 600. Furthermore, it is presented that application components of system 600 may interface with other application services. Application services may be any resource that may extend functionality of one or more components of system 600. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600. Exemplary system 600 comprises application components 606 including a user interface component 608, an input recognition component 610 and an application extension service component 612, where each of the identified components may comprise one or more additional components.

System 600 may further comprise one or more storage(s) 614 that may store data associated with operation of one or more components of system 600. In examples, storage(s) 614 may interface with other components of system 600. Data associated with any component of system 600 may be stored in storage(s) 614, where components may be connected to storage(s) 614 over a distributed network including cloud computing platforms and infrastructure services. Exemplary storage(s) 614 may be any of a first-party source, a second-party source, and a third-party source. Storage(s) 614 are any physical or virtual memory space.

Storage(s) 614 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 614 or retrieved from one or more resources external to system 600 by knowledge fetch operation. In examples (as described below) storage(s) 614 may store exemplary data programs/services and other types of data for: soft keyboard applications, user interface definitions, management of knowledge data, management of exemplary application/service extensions, and operations for query processing, among other examples.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, watches, and any other collection of electrical components such as devices having one or more processors or circuits. In one example processing device 602 may be a device of a user that is executing applications/services. In examples, processing device 602 may communicate with the application components 606 via a network 604. In one aspect, network 604 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device. In examples, processing device 602 is an example of a device that may send/receive query data. Processing device 602 may be further connected with storage(s) 614 via a distributed network.

The application components 606 are components configured for management of continuous gesture input processing by a soft keyboard application. Application components 606 may comprise a user interface component 608, an input recognition component 610 and an application extension service component 612. Application components 606 may further comprise application components for language processing, which are known to one skilled in the art.

The user interface component 608 is one or more components of system 600 that are configured to enable interaction with a user of an exemplary soft keyboard application. The user interface component 608 may be configured to execute any of the processing operations described in method 400. Transparency and organization are brought to users of such an application/service through the user interface component 608 where a user can interact with an application through user interface elements. As an example, the user interface component 608 may comprise generation and display of one or more user interface elements upon a display of a computing device. For example, the user interface component 608 may be configured to enable an exemplary soft keyboard application to receive entry and a process a continuous gesture input. The user interface component 608 may further execute as a front-end for display of back-end processing performed by the other application components 606. In examples, user interface definition files may comprise programming instructions or operations for management and display of user interface elements associated with user interface component 608. Among other examples, the user interface component 608 may further provide an interface to receive results data from application/services that are integrated with an exemplary soft keyboard application.

The input recognition component 610 is one or more components of system 600 that are configured to receive, process and interpret an input. As described previously, an exemplary input is a continuous gesture input. The input recognition component 610 may be configured to execute any of the processing operations described in method 400. When a gesture input is received, for example via the user interface component 608, the input is transmitted to the input recognition component 610 for processing. Examples of processing of a continuous gesture input have been described previously.

The application extension service component 612 is one or more components of system 600 that are configured to integrate applications/services with an exemplary soft keyboard application. The application extension service component 612 may be configured to execute any of the processing operations described in method 400. In examples, the application extension service component 612 may interface with other application components 606 (e.g. the user interface component 608 and the input recognition component 610) through exemplary application extensions.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving, through a soft keyboard application executing on a computing device, a gesture input that includes query input;
displaying, based on at least a portion of the gesture input, one or more application extensions within the soft keyboard application;
receiving, as part of the gesture input, a selection of an application extension of the one or more application extensions displayed within the soft keyboard application;
processing the query input using a component associated with the selected application extension; and
providing a result for the query input, wherein the result is provided by the component associated with the selected application extension.

2. The method according to claim 1, wherein the gesture input is a swipe action, and wherein the query input comprises one or more of: an alphanumeric character, a symbol, an image, an icon, and a punctuation mark.

3. The method according to claim 1, wherein the result is provided within the soft keyboard application.

4. The method according to claim 1, further comprising displaying one or more features associated with the application extension in response to sensing a pause at the application extension during the gesture input, and wherein the receiving of the gesture input comprises receiving a selection of the one or more features within the gesture input.

5. The method according to claim 1, wherein the gesture input comprises a pause at the application extension and resumes movement to a second application extension, wherein the processing processes the query input using the component associated with the application extension and a component associated with the second application extension, and wherein the providing provides a first result from the component associated with the application extension and a second result from the component associated with the second application extension.

6. The method according to claim 1, wherein the gesture input comprises a pause at a portion of an application command control that comprises a plurality of application extensions, and wherein the method further comprising: identifying the pause at the portion of the application command control and displaying one or more additional application extensions for selection, and wherein the application extension is selected from the one or more additional application extensions.

7. The method according to claim 1, wherein the gesture input comprises a pause at a portion of an application command control that comprises the application extension, and wherein the method further comprising: identifying the pause at the portion of the application command control and displaying one or more additional application extensions for selection, and wherein the gesture input comprises a selection of the one or more additional application extensions.

8. The method according to claim 7, wherein the providing provides a first result from the component associated with the application extension and a second result from a component associated with the one or more additional application extensions.

9. The method according to claim 1, wherein the soft keyboard application executing on the computing device is a software component within an initial application.

10. The method according to claim 1, the method further comprising:
receiving, through the soft keyboard application, a second gesture input that comprises a second query input;
after receiving the second gesture input, receiving a selection of a second application extension displayed within the soft keyboard application;
after receiving the selection of the second application extension, processing the second query input using a component associated with the second application extension; and
providing a result for the second query input, wherein the result is provided by the component associated with the second application extension.

11. A system comprising:
at least one processor; and
a memory operatively connected with the at least one processor storing computer-executable instructions that, when executed by the at least one processor, causes the at least one processor to execute a method that comprises:
receiving, through a soft keyboard application executing on the system, a gesture input that includes query input,
displaying, based on at least a portion of the gesture input, one or more application extensions within the soft keyboard application,
receiving, as part of the gesture input, a selection of an application extension of the one or more application extensions displayed within the soft keyboard application,
processing the query input using a component associated with the selected application extension, and
providing a result for the query input, wherein the result is provided by the component associated with the selected application extension.

12. The system according to claim 11, wherein the gesture input is a swipe action, and wherein the query input comprises one or more of: an alphanumeric character, a symbol, an image, an icon, and a punctuation mark.

13. The system according to claim 11, wherein the gesture input is received from one or more selected from a group that comprises: one or more fingers, a stylus, and a mouse.

14. The system according to claim 11, wherein the method executed by the at least one processor further comprises: displaying one or more features associated with the application extension in response to sensing a pause at the application extension during the gesture input, and wherein the receiving of the gesture input comprises receiving a selection of the one or more features within the gesture input.

15. The system according to claim 11, wherein the gesture input comprises a pause at the application extension and resumes movement to a second application extension, wherein the processing processes the query input using the component associated with the application extension and a component associated with the second application extension, and wherein the providing provides a first result from the component associated with the application extension and a second result from the component associated with the second application extension.

16. The system according to claim 11, wherein the gesture input comprises a pause at a portion of an application command control that comprises a plurality of application extensions, and wherein the method further comprises: identifying the pause at the portion of the application command control and displaying one or more additional application extensions for selection, and wherein the application extension is selected from the one or more additional application extensions.

17. The system according to claim 11, wherein the gesture input comprises a pause at a portion of an application command control that comprises the application extension, and wherein the method further comprises: identifying the pause at the portion of the application command control and displaying one or more additional application extensions for selection, and wherein the gesture input comprises a selection of the one or more additional application extensions.

18. The system according to claim 17, wherein the providing provides a first result from the component associated with the application extension and a second result from a component associated with the one or more additional application extensions.

19. A method comprising:
    accessing, on a computing device, a soft keyboard application;
    providing, through the soft keyboard application, a gesture input that includes a query input and a pause;
    displaying, based on at least the pause, one or more application extensions within the soft keyboard application;
    receiving, as part of the gesture input, a selection of a user interface feature of the application extension that is displayed in response to the pause; and
    after receiving the selection of a user interface feature of the application extension, receiving one or more results for the query input, wherein the one or more results are provided by a component associated with the selected application extension based on the gesture input.

20. The method according to claim 19, wherein the gesture input is a swipe action, and wherein the query input comprises one or more of: an alphanumeric character, a symbol, an image, an icon, and a punctuation mark.

* * * * *